United States Patent [19]

Thompson

[11] 4,257,614
[45] Mar. 24, 1981

[54] RECORD PLAYERS
[75] Inventor: Raymond J. T. Thompson, Sedgley, England
[73] Assignee: BSR Limited, Cradley Heath, United Kingdom
[21] Appl. No.: 20,706
[22] Filed: Mar. 15, 1979
[30] Foreign Application Priority Data
  Sep. 2, 1978 [GB] United Kingdom ............... 5183/78
[51] Int. Cl.³ .............................................. G11B 3/60
[52] U.S. Cl. .................................................. 369/267
[58] Field of Search .................... 274/39 A, 9 A, 9 R; 74/242.3, 242.4

[56] References Cited
U.S. PATENT DOCUMENTS
3,485,498 12/1969 Smith ................................... 274/9 A
3,570,318  3/1971 Nakadaira ...................... 274/9 A X FOREIGN PATENT DOCUMENTS
523922  5/1921 France ..................................... 74/242.4
520897  5/1940 United Kingdom .
1012724 12/1965 United Kingdom .
1260752  1/1972 United Kingdom .

Primary Examiner—Harry N. Haroian
Attorney, Agent, or Firm—Hopgood, Calimafde, Kalil, Blaustein & Lieberman

[57] ABSTRACT

A speed change device for a record player which has a belt drive engaged with a drive pulley on the turntable and with a stepped pulley driver by an electric motor, having a pivotally mounted, belt engaging arm which is acted on by cam means to move the arm in a direction to move the belt outwardly of the stepped pulley, in a direction to move the belt along a path parallel to the axis of the stepped pulley and in a direction to move the belt transversely inwardly of the stepped pulley.

4 Claims, 4 Drawing Figures

RECORD PLAYERS

BACKGROUND OF THE INVENTION

This invention relates to a record player of the type, hereinafter referred to as the type described, comprising a deck plate having a turntable rotatably mounted thereon and driven by an electric motor through a belt engaged with a drive pulley on the turntable and with a stepped pulley driven by the motor and there being speed change means to move the belt so that it can be engaged with a desired diameter part of the stepped pulley to permit adjustment of the speed of rotation of the turntable.

SUMMARY OF THE INVENTION

The object of the invention is to provide improvements in the speed change means of a record player of the type described.

According to the present invention we provide a record player of the type described wherein the speed change means comprises a belt engaging arm, means to move said arm in a direction to move the belt transversely outwardly of the stepped pulley, in a direction to move the belt along a path parallel to the axis of the stepped pulley, and in a direction to move the belt transversely inwardly of the stepped pulley.

The belt engaging arm may be moved in said directions by cam means.

The belt engaging arm may be pivotally and axially slidably mounted on the deck plate about an axis parallel to and spaced from the axis of rotation of the stepped pulley and is engaged by a drive member slidably mounted on the deck plate in a plane transverse to said axis, the arm or the drive member being provided with a pair of cam surfaces and the drive member or the arm respectively being provided with cam followers which engage the cam surfaces, one cam surface causing axial movement of the arm in one direction and the other cam surface causing axial movement of the arm in the other direction.

The cam surfaces may cause pivotal movement of the arm in one direction and resilient biasing means may be provided to cause pivotal movement of the arm in the opposite direction.

One cam surface may comprise an upwardly facing surface having two spaced horizontal portions at different heights interconnected by an inclined portion and the other cam surface may comprise a downwardly facing surface having two spaced horizontal parts interconnected by an inclined part with both the cam surfaces extending rectilinearly and parallel to each other and on opposite sides of the axis of pivot of the belt engaging arm, the one cam surface engaging the undersurface of a cam follower extending from the arm on one side of the axis of pivot and the other cam surface engaging the upper surface of a cam follower extending from the arm on the other side of the axis of pivot.

The cam followers may be of the same configuration as each other and extend diametrically from the arm, the cam surfaces being at different relative axial locations.

The drive member may be slid relatively to the deck plate by means of a manually engageable lever which may be connected to the drive member by a link means and the link means may include an over dead centre mechanism.

BRIEF DESCRIPTION OF THE DRAWINGS

The invention will now be described in more detail by way of example with reference to the accompanying drawings wherein.

DESCRIPTION OF THE PREFERRED EMBODIMENT

Figure 1:
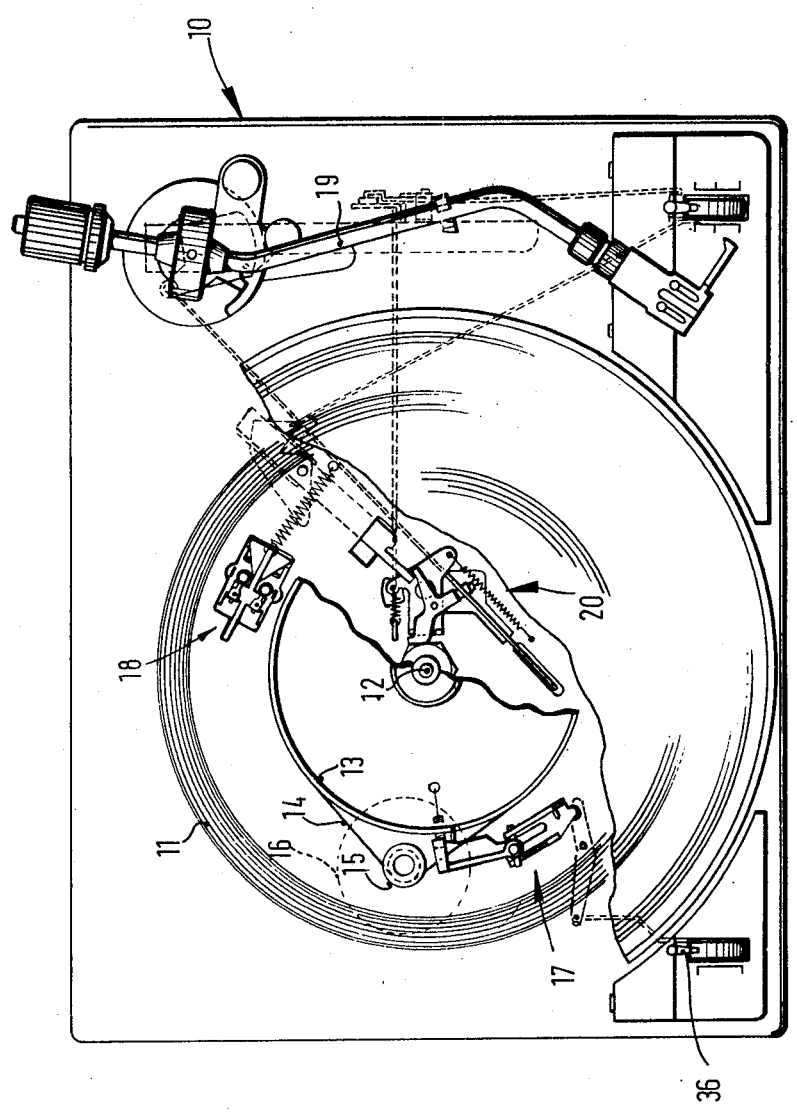
FIG. 1 is a plan view, partly broken away, of a record player embodying the invention.

Referring to the drawings a record player comprises a deck plate 10 having a turntable 11 rotatably mounted thereon and having a centre spindle 12 at its centre. The turntable 11 has a driving boss 13 on its undersurface engaged by a belt 14 driven by a stepped pulley 15 on the shaft of an electric motor 16. A speed change mechanism indicated generally at 17 is provided as hereinafter to be described in more detail. In addition a muting switch 18 is provided, as described in more detail in our co-pending application Ser. No. 20,705, filed 3/15/79, and a drive means is provided for moving a tone arm 19 into and out of playing engagement with a record on the turntable 11, as described in more detail in our co-pending application Ser. No. 20,704, filed 3/15/79, now abandoned. The record player is also provided with a switch-off mechanism indicated generally at 20 as described in more detail in our Specification U.S. Pat. No. 4,133,539 filed on the Oct. 13th, 1977.

Figure 2:
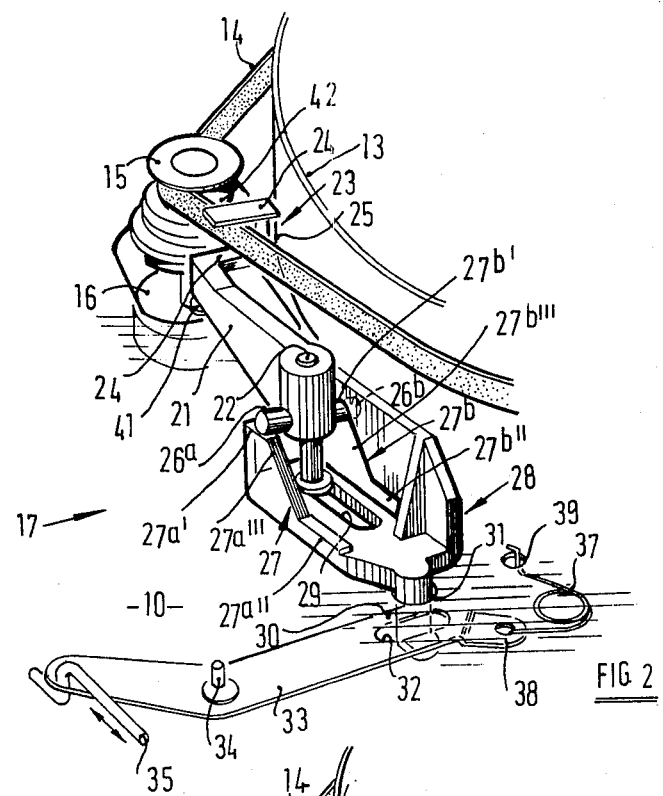
FIG. 2 is an enlarged fragmentary perspective view of a speed change means of the record player of FIG. 1 and showing the parts in position for driving the turntable at 33. rpm.

Referring now particularly to FIG. 2 the speed change means 17 comprises a belt engaging arm 21 pivotally and axially slidably mounted on a spindle 22 extending upwardly from the deck plate 10. The arm 21 has a generally U-shaped belt engaging part 23 comprising a pair of spaced parallel limbs 24 and a side wall 25, the belt 14 being received between the limbs 24 and being engageable by the side wall 25 as hereinafter described.

Projecting from the arm 21 at diametrically opposite locations relative to the spindle 22 are a pair of cylindrical cam followers 26a, 26b.

The cam followers 26a and 26b are engaged by cam surfaces 27a, 27b provided on a drive member 28 which is slidably mounted on the deck plate 10 and is guided for such movement by the providing of a slot 29 in the drive member in which the spindle 22 is received and by means of a downwardly projecting stem 30 received in a slot 31 in the deck plate and engaged in a slot 32 formed in a cranked lever 33 pivoted to the deck plate 31 by means of a pivot pin 34 and moved about the pivot pin 34 by means of a link 35 connected to a manually engageable speed change lever 36. The cranked lever 33 is provided with an over dead-centre action by means of a hairspring 37 one limb of which is received in an aperture 38 in one end of the lever 33 the other limb of which is received in an aperture 39 in the deck plate 10.

Figure 3:
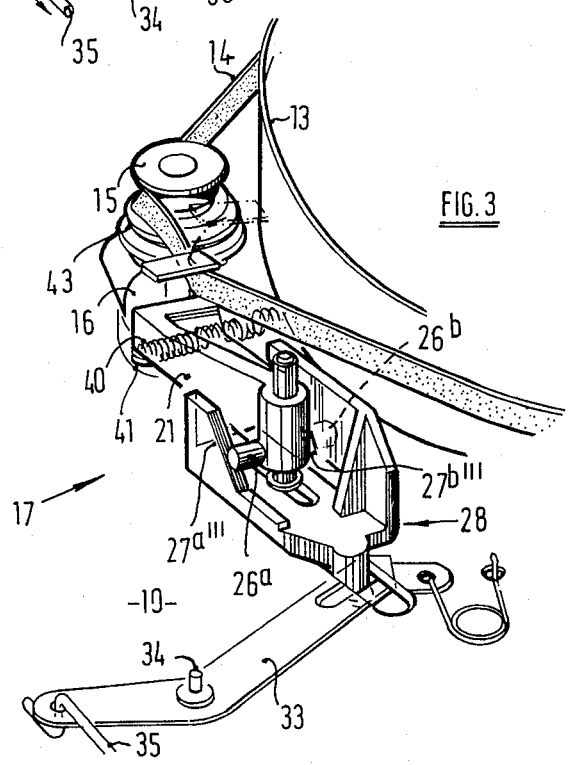
FIG. 3 is a view similar to that of FIG. 2 but showing the speed change mechanism part way through a speed change.

A coil tension spring 40, best shown in FIG. 3, is connected between a lug 41 depending from the undersurface of the arm 21 and an aperture, not shown, in the deck plate 10.

The cam surface 27a faces upwardly and engages an under surface of the cam follower 26a and comprises two horizontal parts 27a' 27a" interconnected by an inclined part 27a'". The surface 27b faces downwardly and engages an upper part of the cam follower 26b and comprises two horizontal parts 27b' and 27b" interconnected by an inclined part 27b'".

When the turntable is to be rotated at 33 r.p.m. the parts are in the position shown in FIG. 2 with the belt 14 engaged with a smaller diameter part 42 of the pulley 15 and the cam followers 26a and 26b are engaged with the horizontal parts 27a ' and 27b ' of the cam surfaces so that the arm 21 is maintained in its uppermost position and is maintained transversely out of engagement with the belt by means of the coil spring 40.

Figure 4:
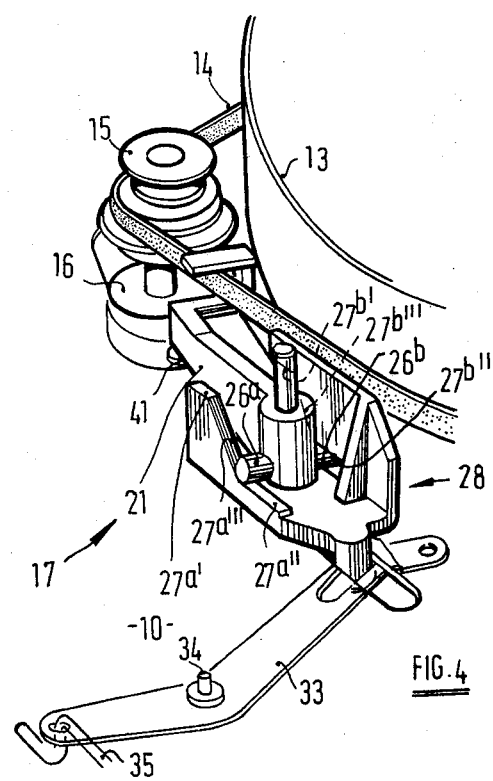
FIG. 4 is a view similar to that of FIG. 2 but showing the parts in position for driving the turntable at 45. rpm.

When it is desired to change the speed of rotation of the turntable the lever 36 is operated to move the link 35 to cause anti-clockwise pivotal movement of the lever 33 about the spindle 34 through the position shown in FIG. 3 to the position shown in FIG. 4 thus causing sliding movement of the drive member 28 to the position shown in FIG. 4.

Initially, the movement of the drive member 28 causes engagement between the inclined part 27b'" of the cam surface and the cam follower 26b whilst the cam follower 26a is still in engagement with the horizontal cam surface 27a'. This causes pivotal movement of the arm 21 about the pin 22 to engage the side wall 25 with the belt 14 to lift the belt in a direction transversely outwardly relative to the pulley 15. Continued movement of the drive member 28 causes engagement of the cam follower 26a with the inclined part 27a'" thus causing downwards axial movement of the arm 21 whilst it is maintained in its outwardly pivoted position as shown in FIG. 3. This displaces the belt 14 downwardly and causes the belt to become aligned with a larger diameter part 43 of the pulley 15. The parts 42 and 43 of the pulley 15 are of generally barrel shaped configuration so as to provide a lead for the belt 14 and also to ensure that the belt 14 stays centered on its respective part 42 or 43, and also clear of limbs 24.

As a result of the pulley 15 rotating, the belt 14 becomes aligned with the larger diameter part 43 and continued movement of the drive member 28 to the position shown in FIG. 4 causes the cam followers to become engaged with the horizontal parts 27a" and 27b" thus permitting the arm 21 to pivot to its innermost position under the influence of the coil tension spring 40 as shown in FIG. 4, so that the arm 21 is disengaged from the belt.

To change the speed in the reverse direction the reverse sequence of operations occurs so that the surface 27a'" engages cam follower 26a while cam follower 26b is still in engagement with surface 27b" causing the arm 21 to be pivoted outwardly followed by engagement of surfaces 27b'" with cam follower 26b which causes raising of the arm 21 and movement of the belt into position for engagement with the smaller diameter part 42 of the pulley 15, followed by engagement of the cam followers by the horizontal parts 27a' and 27b' permitting pivotal movement of the arm 21 under the influence of the spring 40 to the position shown in FIG. 2.

I claim:

1. A speed changing mechanism for a record player of the type having a deck plate, a turntable rotatably mounted on said deck plate, a motor driven pulley, and a belt rotatably coupling said pulley and said turntable, said pulley having first and second belt engaging surfaces of first and second diameters, when said belt is in engagement with said first belt engaging surface, said turntable being driven at a first speed, when said belt is in engagement with said second belt engaging surface of said pulley said turntable being driven at a second speed, the improvement comprising:
   a belt engaging arm for moving said belt between said first and second surfaces of said pulley;
   said arm being mounted on said deck plate for pivotal movement about an axis parallel to and spaced apart from the axis of rotation of said pulley and for axial movement along said axis of said arm;
   a drive member mounted on said deck plate for sliding movement in a plane transverse to said arm axis between first and second predetermined positions;
   manually operable means connected to said drive member to move said drive member between said first and second pre-determined positions;
   first and second cam followers on said arm and first and second cam surfaces on said drive member, said cam followers on said arm and said cam surfaces on said drive members being in direct operative engagement, said first cam surface causing axial movement of said arm in a second direction, movement of said drive member from said first predetermined position to said second predetermined position causing said arm to move said belt first transversely outwardly of said pulley, thereafter along a path parallel to the axis of said pulley, then transversely inwardly of said pulley.

2. A speed changing mechanism as claimed in claim 1 wherein said first and second cam surfaces cause pivotal movement of said arm in a first direction and resilient biasing means are provided to cause pivotal movement of the arm in a second direction.

3. A speed changing mechanism as claimed in claim 2, wherein said first cam surface comprises an upward facing surface having two spaced horizontal portions at different heights interconnected by an inclined portion, said second cam surface comprises a downward facing surface having two spaced horizontal parts interconnected by an inclined part, said first and said second cam surfaces extending parallel to each other on opposite sides of the pivotal axis of said belt engaging arm, said first cam surface engaging the underside of one of said first cam follower, said first cam follower extending from said arm on one side of said pivotal axis and said second cam surface engaging the upper surface of said second cam follower, said second cam follower extending from said arm on the other side of said pivotal axis.

4. A speed changing mechanism as claimed in claim 3 wherein said first and second cam followers are of the same configuration and extend radially from said arm on opposite sides of the pivotal axis of said arm, said first and second cam surfaces being located at different relative axial locations.

* * * * *

UNITED STATES PATENT AND TRADEMARK OFFICE
CERTIFICATE OF CORRECTION

PATENT NO. : 4,257,614

DATED : March 24, 1981

INVENTOR(S) : Raymond J. Thompson

It is certified that error appears in the above-identified patent and that said Letters Patent are hereby corrected as shown below:

On Page 1, please delete the following Foreign Application Priority Data, printed under section [30]:

"Sep. 2, 1978 [GB] United Kingdom ..........5183/78"

Signed and Sealed this

Fifteenth Day of September 1981

[SEAL]

Attest:

Attesting Officer

GERALD J. MOSSINGHOFF

Commissioner of Patents and Trademarks